United States Patent
Chen et al.

(10) Patent No.: US 10,089,012 B1
(45) Date of Patent: Oct. 2, 2018

(54) ZERO ON DEMAND OPERATIONS BASED ON ZEROED CHUNK TABLES OF STORAGE DRIVE OBJECTS STORED IN MAIN MEMORY

(71) Applicant: EMC IP Holding Company LLC, Hopkinton, MA (US)

(72) Inventors: Lili Chen, Hopkinton, MA (US); Peter Puhov, Shrewsbury, MA (US); Kimchi Mai, Worcester, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 167 days.

(21) Appl. No.: 14/750,441

(22) Filed: Jun. 25, 2015

(51) Int. Cl.
*G06F 3/06* (2006.01)
(52) U.S. Cl.
CPC ............ *G06F 3/061* (2013.01); *G06F 3/0659* (2013.01); *G06F 3/0683* (2013.01)
(58) Field of Classification Search
None
See application file for complete search history.

(56) References Cited

U.S. PATENT DOCUMENTS

| | | | |
|---|---|---|---|
| 5,943,689 A * | 8/1999 | Tamer | G06F 3/0607 711/166 |
| 8,407,445 B1 | 3/2013 | Pathak et al. | |
| 8,539,282 B1 | 9/2013 | Kabanov et al. | |
| 8,738,681 B1 | 5/2014 | Burke et al. | |
| 9,009,426 B1 | 4/2015 | O'Brien, III et al. | |
| 9,110,914 B1 | 8/2015 | Frank et al. | |
| 9,176,675 B1 | 11/2015 | Wang et al. | |
| 2004/0221102 A1* | 11/2004 | Watanabe | G06F 3/0611 711/112 |

\* cited by examiner

*Primary Examiner* — Gary W. Cygiel
(74) *Attorney, Agent, or Firm* — BainwoodHuang

(57) ABSTRACT

A technique processes input/output (I/O) requests from a set of host computers. The technique utilizes data storage equipment which includes a set of physical storage drives and storage processing circuitry which accesses the set of physical storage drives. The technique involves storing, by the storage processing circuitry, a set of storage drive objects in main memory. The set of storage drive objects includes a set of zeroed chunk tables. Each storage drive object (i) represents a physical storage drive and (ii) includes a zeroed chunk table which identifies storage chunks of that physical storage drive that have been initialized to zero. The technique further involves receiving, by the storage processing circuitry, I/O requests from the set of host computers, and performing, by the storage processing circuitry, I/O tasks in response to the I/O requests. The I/O tasks include zero on demand operations based on the set of zeroed chunk tables.

17 Claims, 4 Drawing Sheets

US 10,089,012 B1

ZERO ON DEMAND OPERATIONS BASED ON ZEROED CHUNK TABLES OF STORAGE DRIVE OBJECTS STORED IN MAIN MEMORY

BACKGROUND

A conventional data storage system divides the available storage on each physical storage disk into a data section and metadata section which is separate from the data section. The data section on each storage disk is divided into a range of 1 megabyte (MB) slices to hold regular data. The metadata section on each storage disk describes the current state of each 1 MB slice in the data section of that storage disk.

For example, when a logical unit of storage (LUN) is bound, the metadata section of each storage disk is marked to indicate that each 1 MB slice of the LUN must be initialized to zero. Next, a low priority service is started to initialize the marked 1 MB slices to zero and the data storage system begins performing read and write operations on behalf of one or more host computers. Then, for incoming read and write operations, the data storage system checks (i.e., reads) the metadata sections of the storage disks to determine whether the 1 MB slices to be accessed have been initialized to zero. Any 1 MB slices to be accessed that have not yet been initialized to zero are initialized to zero at the time of performing the write operations.

SUMMARY

It should be understood that there are deficiencies to the above-described conventional data storage system which performs read and write operations by reading metadata sections of storage disks to determine whether 1 MB slices to be accessed have been initialized to zero. For example, the data section and the metadata section of the storage disk may be far apart from each other. In such a situation, reading the metadata section of a storage disk to determine whether 1 MB slices of the storage disk have been initialized to zero before accessing the data section of the storage disk reduces disk performance. Moreover, average seek time is greatly increased.

In contrast to the above-described conventional data storage system which requires reading of metadata sections of storage disks to determine whether 1 MB slices have been initialized to zero, improved techniques are directed to processing input/output (I/O) requests based on a set of zeroed chunk tables of a set of storage drive objects stored in main memory (i.e., primary or cache memory). Each storage drive object represents a physical storage drive, and the zeroed chunk table of each storage drive object indicates which storage chunks (i.e., which chunk of storage, etc.) of that physical storage drive have been initialized to zero. Accordingly, such techniques enable data storage circuitry to determine whether storage chunks require initializing to zero while processing I/O requests, but without having to read metadata sections from physical storage disks. As a result, I/O performance is improved (i.e., less read operations performed on the drives) and average seek time greatly reduced.

One embodiment is directed to a method which is performed in data storage equipment which includes a set of physical storage drives and storage processing circuitry which is constructed and arranged to access the set of physical storage drives. The method processes (I/O) requests from a set of host computers. The method includes storing, by the storage processing circuitry, a set of storage drive objects in main memory of the storage processing circuitry. The set of storage drive objects includes a set of zeroed chunk tables. Each storage drive object (i) represents a physical storage drive and (ii) includes a zeroed chunk table which identifies storage chunks of that physical storage drive that have been initialized to zero. The method further includes receiving, by the storage processing circuitry, I/O requests from the set of host computers, and performing, by the storage processing circuitry, I/O tasks in response to the received I/O requests. The I/O tasks include zero on demand (ZOD) operations based on the set of zeroed chunk tables of the set of storage drive objects stored in the main memory of the storage processing circuitry. Since the need for ZOD operations can be determined from accessing main memory rather than reading from physical storage drives, I/O performance is improved and average seek time is optimized.

In some arrangements, the method further includes receiving a bind command for a logical unit of storage (LUN). In these arrangements, the method further includes marking, in response to the bind command and prior to receiving the I/O requests from the set of host computers, the set of zeroed chunk tables of the set of storage objects to indicate that non-zeroed storage chunks of the LUN must be initialized to zero. The method further includes directing, after marking the set of zeroed chunk tables of the set of storage objects, a background service to initialize to zero the non-zeroed storage chunks of the LUN based on the set of zeroed chunk tables of the set of storage objects.

In some arrangements, performing the I/O tasks in response to the I/O requests includes:
(A) receiving an I/O request to access the LUN from a host computer, the I/O request identifying a storage chunk on a particular physical storage drive of the set of physical storage drives,
(B) accessing a particular storage drive object representing the particular physical storage drive to determine, from the zeroed chunk table of the particular storage drive object, whether the storage chunk on the particular physical storage drive has been initialized to zero, and
(C) only after the storage chunk on the particular physical storage drive has been initialized to zero, accessing the storage chunk on the particular physical storage drive in accordance with the I/O request.

In some arrangements, performing the I/O tasks in response to the I/O requests includes performing read and write operations in response to the I/O requests while the background service initializes to zero the non-zeroed storage chunks of the LUN based on the set of zeroed chunk tables of the set of storage objects. In these arrangements, the read and write operations are performed within the data storage equipment as higher priority operations relative to the background service.

In some arrangements, each physical storage drive includes (i) a data area which provides storage chunks in a contiguous region, and (ii) a metadata area which is separate from the data area and which stores metadata indicating which storage chunks in the contiguous region have been initialized to zero. In these arrangements, the method further includes, in response to initializing to zero storage chunks in the contiguous region of each physical storage drive, updating the metadata of the metadata area of that physical storage drive to indicate which storage chunks in the contiguous region have been initialized to zero.

In some arrangements, the method further includes maintaining synchronization between the metadata of the metadata area of each physical storage drive and the set of zeroed chunk tables of the set of storage drive objects stored in the main memory of the storage processing circuitry.

Another embodiment is directed to data storage equipment which includes a set of host interfaces constructed and arranged to communicate with a set of host computers, a set of physical storage drives, and control circuitry coupled to the set of host interfaces and set of physical storage drives. The control circuitry is constructed and arranged to:

(A) store a set of storage drive objects in main memory of the storage processing circuitry, the set of storage drive objects including a set of zeroed chunk tables, each storage drive object (i) representing a physical storage drive and (ii) including a zeroed chunk table which identifies storage chunks of that physical storage drive that have been initialized to zero, (B) receive input/output (I/O) requests from the set of host computers through the set of host interfaces, and (C) perform I/O tasks in response to the I/O requests, the I/O tasks including zero on demand (ZOD) operations based on the set of zeroed chunk tables of the set of storage drive objects stored in the main memory of the storage processing circuitry.

Yet another embodiment is directed to a computer program product having a non-transitory computer readable medium which stores a set of instructions to process input/output (I/O) requests. The set of instructions, when carried out by computerized circuitry, causes the computerized circuitry to perform a method of:

(A) storing a set of storage drive objects in main memory of the storage processing circuitry, the set of storage drive objects including a set of zeroed chunk tables, each storage drive object (i) representing a physical storage drive and (ii) including a zeroed chunk table which identifies storage chunks of that physical storage drive that have been initialized to zero;

(B) receiving I/O requests from the set of host computers; and (C) performing I/O tasks in response to the received I/O requests, the I/O tasks including zero on demand (ZOD) operations based on the set of zeroed chunk tables of the set of storage drive objects stored in the main memory of the storage processing circuitry.

It should be understood that, in the cloud context, at least some of the electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in performing ZOD operations based on zeroed chunk tables of storage drive objects stored in main memory.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to processing input/output (I/O) requests based on a set of zeroed chunk tables of a set of storage drive objects stored in main memory (i.e., primary or cache memory). Each storage drive object represents a physical storage drive, and the zeroed chunk table of each storage drive object indicates which storage chunks (i.e., units of storage) of that physical storage drive have been initialized to zero (e.g., in response to binding of a logical unit of storage or LUN). Accordingly, such techniques enable data storage circuitry to determine whether storage chunks require initializing to zero while processing I/O requests but without having to read metadata sections from physical storage disks in a manner that would otherwise reduce I/O performance and greatly increase average seek time.

Figure 1:
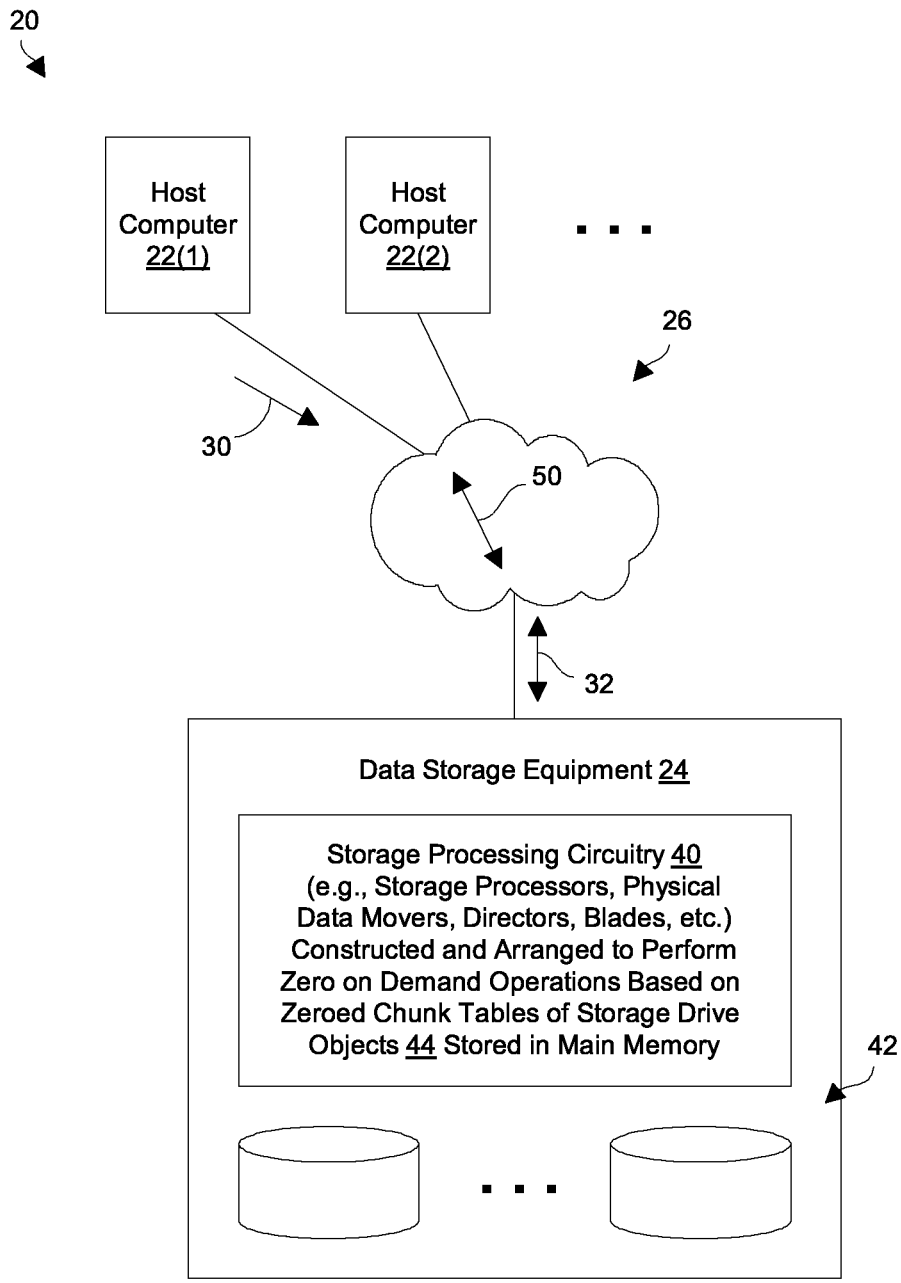
FIG. 1 is a block diagram of a data storage environment which utilizes zeroed chunk tables of storage drive objects stored in main memory to indicate which storage chunks have been initialized to zero.

FIG. 1 shows a data storage environment 20 which utilizes zeroed chunk tables of storage drive objects stored in main memory to indicate which storage chunks have been initialized to zero. The data storage environment 20 includes host computers 22(1), 22(2), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, and so on, which provides I/O requests 30 (e.g., small computer system interface or SCSI commands) to the data storage equipment 24 to store host data 32 in and read host data 32 from the data storage equipment 24.

The data storage equipment 24 includes storage processing circuitry 40 and a set of storage drives 42. The storage processing circuitry 40 may include one or more physical storage processors, data movers, director boards, blades, I/O modules, storage drive controllers, switches, combinations thereof, and so on. The storage processing circuitry 40 is constructed and arranged to process the I/O requests 30 from the host computers 22 by robustly and reliably storing host data 32 in the array of storage drives 42 and retrieving the host data 32 from the set of storage drives 42. Additionally, as will be explained in further detail shortly, the storage processing circuitry 40 performs zero on demand (ZOD) operations on storage chunks (e.g., 1 MB units of storage) based on zeroed chunk tables of storage drive objects 44 stored in main memory to improve I/O performance.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, combinations thereof, etc.

During operation, the storage processing circuitry 40 of the data storage equipment 24 stores a set of storage drive objects 44 in main memory. Each storage drive object 44 (i) represents a physical storage drive 42 and (ii) including a zeroed chunk table which identifies storage chunks of that physical storage drive that have been initialized to zero. The storage processing circuitry 40 then receives I/O requests 30 from the host computers 22 and performs I/O tasks in response to the received I/O requests 30. Such I/O tasks include zero on demand (ZOD) operations based on the set of zeroed chunk tables of the set of storage drive objects 44. Further details will now be provided with reference to FIG. 2.

Figure 2:
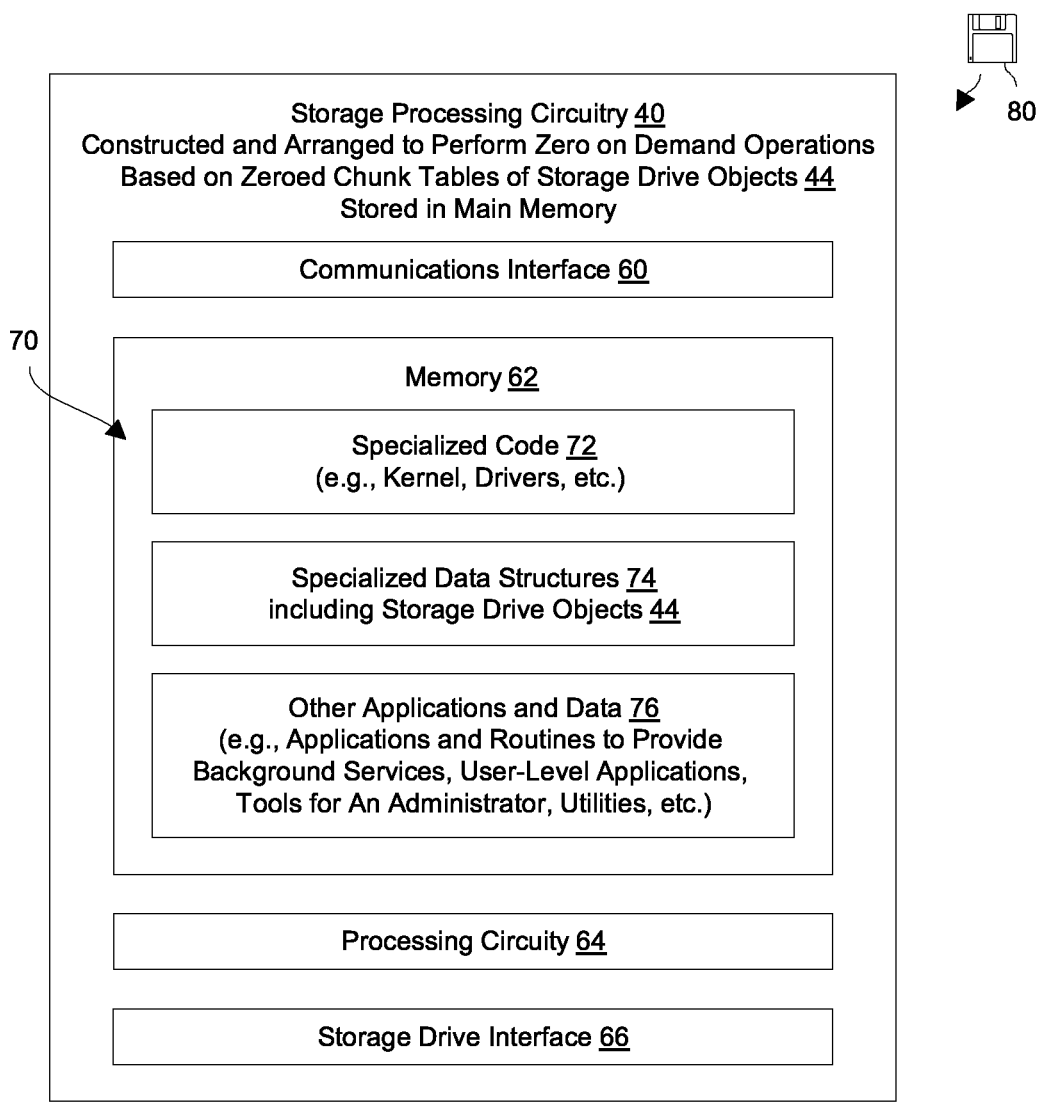
FIG. 2 is a block diagram of storage processing circuitry of the data storage environment of FIG. 1.

FIG. 2 shows particular details of the storage processing circuitry 40 of the data storage equipment 24 (also see FIG. 1). The storage processing circuitry 40 includes a communications interface 60, memory 62, and processing circuitry 64, and a storage drive interface 66.

The communications interface 60 is constructed and arranged to connect the storage processing circuitry 40 to the communications medium 26 (also see FIG. 1) to enable communications with other devices of the data storage environment 20 (e.g., the host computers 22). Such communications may be IP-based, SAN-based, cellular-based, cable-based, fiber-optic based, wireless, combinations thereof, and so on. Accordingly, the communications interface 60 enables the storage processing circuitry 40 to robustly and reliably communicate with other external apparatus.

The memory 62 is intended to represent both volatile storage (e.g., DRAM, SRAM, etc.) and non-volatile storage (e.g., flash memory, magnetic memory, etc.). The memory 62 stores a variety of software constructs 70 including specialized code 72, specialized data structures including the storage drive objects 44, and other applications and data 76. The specialized code 72 is intended to refer to operating system and control instructions such as a kernel to manage computerized resources (e.g., processor cycles, memory space, etc.), drivers (e.g., an I/O stack), and so on. The specialized data structures 74 includes the storage drive objects 44 as well as other data structures (e.g., cached host data, cache mirroring data, configuration information, etc.). The other applications and data 76 include applications and routines to provide background services (e.g., code for a background service to initialize storage chunks to zero), user-level applications, administrative tools, utilities, and so on.

The processing circuitry 64 is constructed and arranged to operate in accordance with the various software constructs 70 stored in the memory 62. As will be explained in further detail shortly, the processing circuitry 64 executes the specialized code 72 to respond to I/O requests 30 (e.g., read and write commands), as well as initialize storage chunks to zero on demand as necessary. Such processing circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the storage processing circuitry 40. In particular, the computer program product 80 has a non-transitory (or non-volatile) computer readable medium which stores a set of instructions which controls one or more operations of the storage processing circuitry 40. Examples of suitable computer readable storage media include tangible articles of manufacture and apparatus which store instructions in a non-volatile manner such as CD-ROM, flash memory, disk memory, tape memory, and the like.

The storage drive interface 66 is constructed and arranged to communicate with the storage drives 42. Suitable protocols include SATA, SAS, PCIe, and so on.

At the beginning of operation, the storage processing circuitry 40 loads the storage drive objects 44 into main memory, and binds a new LUN for use by a set of host computers 22. As part of the binding process, the storage processing circuitry 40 marks metadata regions on the storage drives 42 as well as zeroed chunk tables of storage drive objects 44 to indicate that the space for the LUN (i.e., storage chunks) must be zeroed, and then starts a background service to initialize the storage chunks of the LUN to zero. Furthermore, the storage processing circuitry 40 begins processing I/O requests 30 from the set of host computers 22.

If an I/O request 30 attempts to write to a storage chunk that is not yet initialized to zero, the storage processing circuitry 40 zeroes that storage chunk on demand before completing the write operation. However, the storage processing circuitry 40 accesses the zeroed chunk tables of storage drive objects 44 to determine which storage chunks have been initialized to zero thus alleviating the need to read the metadata regions on the storage drives 42 to make such a determination. As a result, there are less read operations performed on the storage drives 42 and average seek time is reduced (since the metadata regions are often far away from the data regions). Further details will now be provided with reference to FIG. 3.

Figure 3:
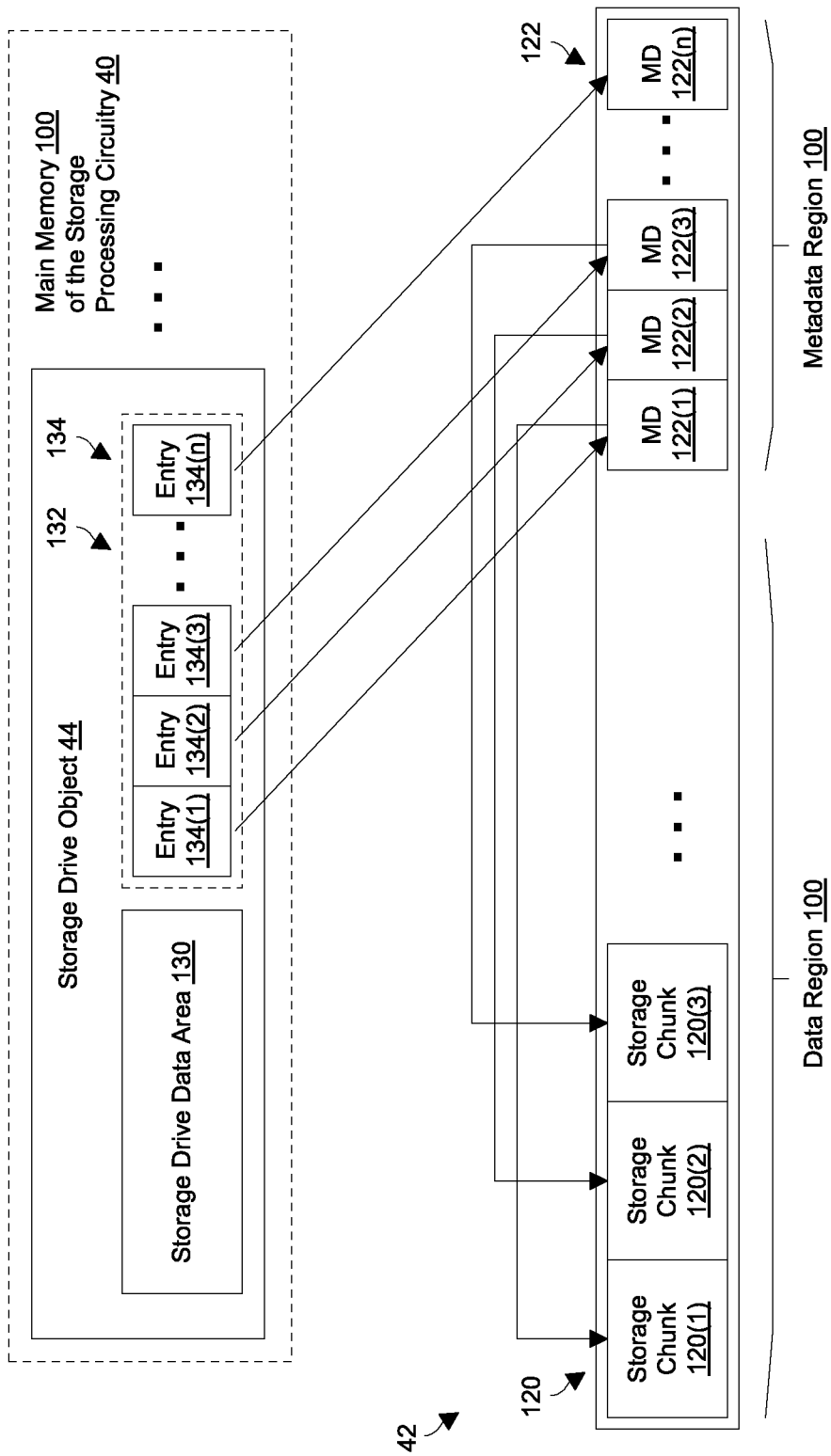
FIG. 3 is a block diagram illustrating particular details of a storage drive object stored in main memory.

FIG. 3 illustrates certain details of a physical storage drive 42 and a storage drive object 44 which (i) represents that storage drive 42 and (ii) resides in main memory 100 of the storage processing circuitry 40. It should be understood that the storage processing circuitry 40 may load storage drive objects 44 into the main memory 100 during system startup time or when a new storage drive 42 is installed (e.g., inserted into the storage array). The storage processing circuitry 40 then updates the contents of particular fields of the storage drive objects 44 with status based on certain events.

As shown in FIG. 3, each physical storage drive 42 includes a data region 110 and a metadata region 112. The data region 110 of each storage drive 42 is divided into 1 MB storage chunks 120(1), 120(2), 120(3), . . . (collectively, storage chunks 120) which are configured to hold regular data (e.g., host data 32, also see FIG. 1). In some arrangements, each storage chunk 120 is 1 MB in size and aligned on a 1 MB boundary. Other sizes are suitable for use as well (e.g., 2 MB, 4 MB, 5 MB, and so on).

The metadata (MD) region 112 of each storage drive 42 is divided into metadata areas 122(1), 122(2), 122(3), . . . 122(n) (collectively, metadata areas 122). Each metadata area 122 corresponds to a respective storage chunk 120 (e.g., see the arrows from the metadata areas 122 to the storage chunks 120), and contains the current status of that storage chunk 120. The storage processing circuitry 40 updates metadata area 122 during certain events which change the status of a corresponding storage chunk 122. For example, when a LUN is bound, the storage processing circuitry 40 marks the metadata areas 122 of corresponding storage chunks 122 to indicate that the drive space for that LUN must be initialized to zero before it can be used. In some arrangements, each metadata area 122 is 2-bytes in size although other sizes are suitable for use as well (e.g., 4-bytes, 8-bytes, etc.).

As further shown in FIG. 3, each storage drive object 44 in main memory 100 includes a storage drive data area 130 and a zeroed chunk table 132. The storage drive data area 130 includes certain information regarding the storage drive 42 that it represents such as a unique drive identifier (ID) to uniquely identify the storage drive 42, array location information, RAID group number and/or ownership data, and so on. The zeroed chunk table 132 includes individual entries 134(1), 134(2), 134(3), . . . , 134(n) (collectively, zeroed chunk table entries 134) which individually refer to the metadata areas 122 and, in turn, correspond to the individual storage chunks 120 (e.g., see the arrows from the zeroed chunk table entries 134 to the metadata areas 122). For example, zeroed chunk table entry 134(1) refers to metadata area 122(1) which corresponds to storage chunk 120(1). Likewise, zeroed chunk table entry 134(2) refers to metadata area 122(2) which corresponds to storage chunk 120(2), and so on. The contents of the zeroed chunk table entries 134 indicate whether the corresponding storage chunks 120 have been initialized to zero.

During operation, the storage processing circuitry 40 maintains synchronization between the zeroed chunk table 132 of the storage drive object 44 and the metadata area 122 of the represented storage drive 42. For example, when a LUN is bound, the storage processing circuitry 40 marks the zeroed chunk table 132 to reflect which storage chunks 122 require initialization to zero. Accordingly, the contents of a zeroed chunk table entries 134 (e.g., entry 134(3)) and a metadata area 122 (e.g., MD 122(3)) concurrently indicate whether a particular storage chunk 120 (e.g., storage chunk 120(3)) has been initialized to zero. In some arrangements, each metadata area 122 is 2-bytes in size although other sizes are suitable for use as well (e.g., 4-bytes, 8-bytes, etc.).

As mentioned above, for a particular storage chunk 120, both the metadata area 122 and the zeroed chunk table entry 134 for that storage chunk 120 indicate whether that storage chunk has been initialized to zero. Once that storage chunk 120 has been initialized to zero (e.g., by a background service, zeroed on demand during a I/O operation, etc.), the metadata area 122 and the zeroed chunk table entry 134 for that storage chunk 120 are reset (or unmarked) to reflect that the storage chunk 120 has been initialized to zero.

Now, suppose that the storage processing circuitry 40 of the data storage equipment 24 receives an I/O request 30 to process. In particular, suppose that the I/O request 30 defines a write task to write host data 32 to a particular storage chunk 120.

When performing the write task, the storage processing circuitry 40 reads the contents of the entry 134 of the zeroed chunk table entry 134 to determine whether the particular storage chunk 120 has been initialized to zero (i.e., whether the storage chunk 120 is a zeroed chunk). If the storage chunk 120 is a zeroed chunk (i.e., the storage chunk 120 has already been initialized to zero), the storage processing circuitry 40 writes the host data 32 to the storage chunk 120 in response to the I/O request 30.

However, if the storage chunk 120 is not a zeroed chunk (i.e., the storage chunk 120 has not yet been initialized to zero), the storage processing circuitry 40 initializes the contents of the storage chunk 120 to zero (i.e., a zero on demand or ZOD operation). Additionally, the storage processing circuitry 40 updates both the metadata area 122 and the zeroed chunk table entry 134 to indicate that the storage chunk 120 has now been zeroed, and writes the host data 32 to the storage chunk 120 in response to the I/O request 30.

Alternatively, suppose that the I/O request 30 defines a read task to read host data 32 from a particular storage chunk 120. When performing the read task, the storage processing circuitry 40 reads the contents of the entry 134 of the zeroed chunk table entry 134 to determine whether the particular storage chunk 120 has been initialized to zero (i.e., whether the storage chunk 120 is a zeroed chunk). If the storage chunk 120 is a zeroed chunk (i.e., the storage chunk 120 has already been initialized to zero), the storage processing circuitry 40 reads and returns the contents of the storage chunk 120 in response to the I/O request 30. Here, the data stored in the storage chunk 120 is actual data that was written to the storage chunk 120 after initialization.

However, if the storage chunk 120 is not a zeroed chunk (i.e., the storage chunk 120 has not yet been initialized to zero), the storage processing circuitry 40 returns zeroes in response to the I/O request 30.

From the various I/O tasks described above, it should be understood that the storage processing circuitry 40 checks the storage drive objects 44 that are cached in the main memory 100 to determine whether particular storage chunks 120 have been initialized to zero. Any storage chunks 120 that are accessed for write operations that have not yet been initialized to zero at the time of processing the write operations are initialized to zero on demand when processing the write operations.

It should be further understood that one I/O task may access multiple storage chunks 120. In such a situation, the storage processing circuitry 40 all of the zeroed chunk table entries 134 to be accessed by that I/O task, and initializes to zero those storage chunks 120 that have not yet been zeroed for write operations.

Figure 4:
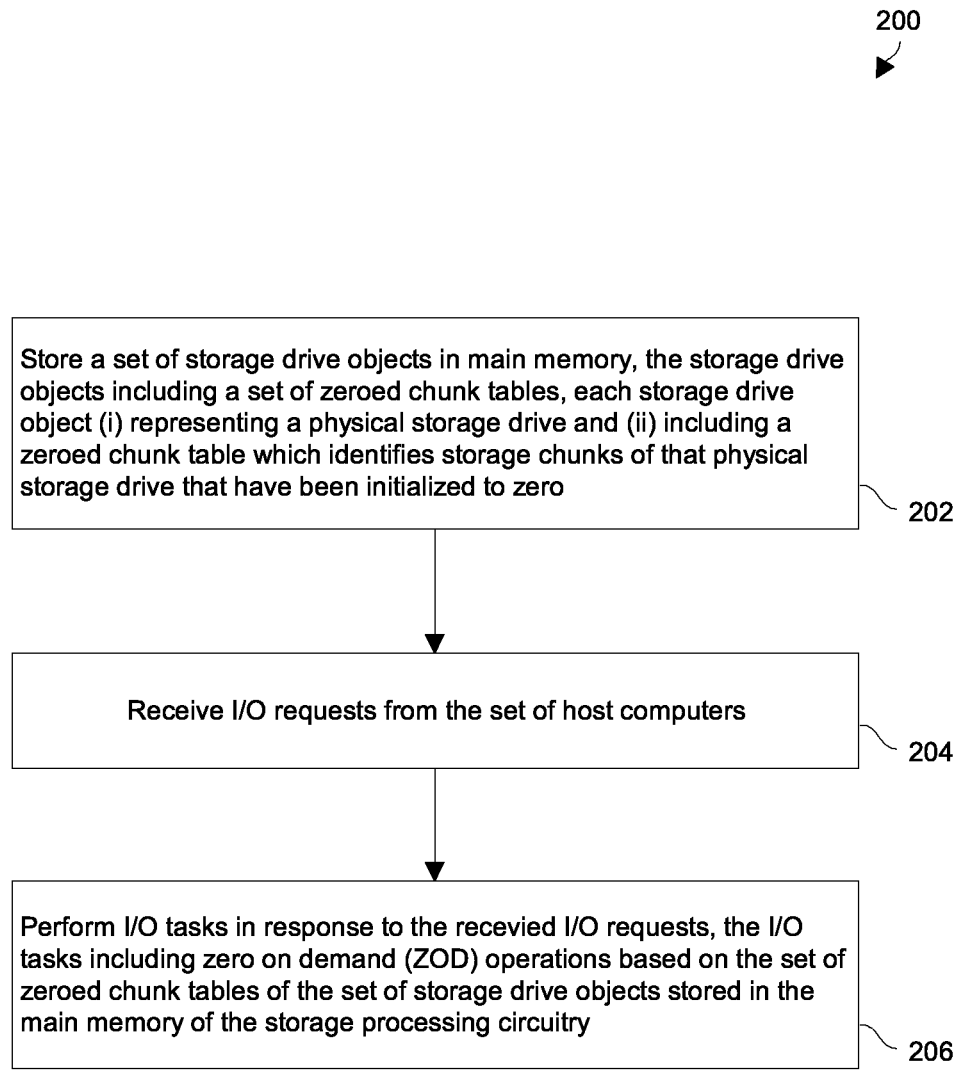
FIG. 4 is a flowchart of a procedure which is performed by the storage processing circuitry of FIG. 2.

During such operation, the storage processing circuitry 40 is able to access the storage drive objects 44 that are cached in the main memory 100. Accordingly, the storage processing circuitry 40 does not need to read the metadata areas 122 on the set of storage drives 42 to make the zero on demand determination. As a result, I/O performance is improved (i.e., less read operations to perform), and average seek time is reduced. Further details will now be provided with reference to FIG. 4.

FIG. 5 is a flowchart of a procedure 200 which is performed by the storage processing circuitry 40 when processing I/O requests from a set of host computers. At 202, the storage processing circuitry 40 stores a set of storage drive objects in main memory. The set of storage drive objects includes a set of zeroed chunk tables, each storage drive object (i) representing a physical storage drive and (ii) including a zeroed chunk table which identifies storage chunks of that physical storage drive that have been initialized to zero.

At this point, the storage processing circuitry 40 may perform other operations such as receiving a bind command for a logical unit of storage (LUN) and, in response to the bind command, marking the set of zeroed chunk tables of the set of storage objects to indicate that non-zeroed storage chunks of the LUN must be initialized to zero (also see FIG. 3). Additionally, the storage processing circuitry 40, after marking the set of zeroed chunk tables of the set of storage objects, begin a background service to initialize to zero the non-zeroed storage chunks of the LUN based on the set of zeroed chunk tables of the set of storage objects.

At 204, the storage processing circuitry 40 receives I/O requests from the set of host computers. The I/O requests may direct the storage processing circuitry 40 to write data to the set of storage drives and/or read data from the set of storage drives (e.g., to access the LUN).

At 206, the storage processing circuitry 40 performs I/O tasks in response to the received I/O requests, the I/O tasks including zero on demand (ZOD) operations based on the set of zeroed chunk tables of the set of storage drive objects stored in the main memory of the storage processing circuitry. Performance of the I/O tasks based on the set of zeroed chunk tables in the main memory alleviates the need to read metadata areas from the set of storage drives. Thus, I/O performance is improved, and average seek time is minimized.

It should be understood that the storage processing circuitry 40 maintains synchronization between the zeroed chunk tables in the main memory and the metadata areas on the set of storage drives. Accordingly, as the background process continues to initialize storage chunks to zero, the zeroed chunk tables in the main memory continue to reflect the current state of such initialization.

As described above, improved techniques are directed to processing I/O requests 30 based on a set of zeroed chunk tables 132 of a set of storage drive objects 44 stored in main memory 100. Each storage drive object 44 represents a physical storage drive 42, and the zeroed chunk table 132 of each storage drive object 44 indicates which storage chunks 120 (e.g., which block, slices, extents, etc.) of that physical storage drive 42 have been initialized to zero. Accordingly, such techniques enable data storage circuitry to determine whether storage chunks 120 require initializing to zero while processing I/O requests 30 but without having to read metadata sections from physical storage disks in a manner that would otherwise reduce I/O performance and greatly increase average seek time.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that, in some arrangements, a storage drive object 44, which is referred to as a provisioned storage drive object (or PVD), is an object which represents a drive in a data storage array. The data for a PVD is divided to data area and paged metadata area. For each chunk of data area (e.g., 1 MB), a small piece of data in the paged metadata area (2 bytes) is dedicated to describing the current state of this chunk.

Additionally, in these arrangements, when a LUN is bound, the LUN will request its space to be zeroed. This is done by marking all of the paged metadata in the drive for the LUN area so that a background service can start zeroing for this LUN. Furthermore, ZOD (zero on demand) happens when an I/O operation is destined to a data area that is not zeroed yet.

In a conventional approach, if a write occurs to a data area which is not background-zeroed, circuitry needs to read the paged metadata area for that chunk. If the data area is not zeroed, the circuitry zeroes the chunk and then performs the write to the area, write paged metadata for that chunk marking that the zeroing is done. However, if the data area is already zeroed, the circuitry performs the write to the disk.

Also, in the conventional approach, if a reads occurs to a data area which is not background-zeroed, the circuitry needs to read the paged metadata area for the chunk. If the chunk is not zeroed yet, the circuitry returns all zeroes. However, if the chunk is already zeroed, the circuitry performs the read.

Unfortunately, with the conventional approach, for each read/write of a chunk which the background service has not yet initialized to zero, there is at least one paged metadata read operations which is performed which greatly reduces performance. Along these lines, for HDD drives, I/O performance is limited by seek time of the disk head. If there are data elements on the HDD drives that are far away from each other (this is the case for our ZOD read/write, since the data area and paged metadata area are located far apart), the average seek time will be greatly increased.

In contrast to the conventional approach, a small structure is added to each PVD object in memory to form an improved PVD. This improved PVD structure includes:

1. 4 slots (the slot number is configurable), each slots including
   1a) 16 bytes cached data (128 bits total), each bit representing one chunk in data area. The bit is set to 1 (cache hit) if the corresponding chunk is already zeroed. Otherwise the bit is set to 0 (cache loss). At initialization, all the bits are set to 0.
   1b) a counter for the last IO which is a hit;
   1c) a counter for the start chunk number for this slot;
2. A spinlock to protect the whole structure;
3. Statistics, including an IO counter recording how many IOs are processed in total. Any read/write usually starts with a paged metadata read. However, before the read is started, the storage drive objects 44 are analyzed first (i.e., a paged metadata cache).

For a read operation, if the appropriate entry or entries in the zeroed chunk table 132 of the storage drive objects 44 indicate that the chunks have been initialized to zero or if there is a read hit, all the chunks for the I/O are zeroed already. Accordingly, there is no ZOD required and the read request is processed without any need to access the paged metadata area.

However, if the appropriate entry or entries in the zeroed chunk table 132 of the storage drive objects 44 indicate that the chunks have not yet been initialized to zero or if there is a read miss, at least one chunk has not been initialized to zero yet. In this situation, the storage processing circuitry returns zeroes.

For a write operation, if the appropriate entry or entries in the zeroed chunk table 132 of the storage drive objects 44 indicate that the chunks have been initialized to zero or if there is a write hit, all the chunks for the I/O are zeroed already. Accordingly, the storage processing circuitry 40 skips the paged metadata operations and send the write request to the set of storage drives.

However, for a write operation in which the appropriate entry or entries in the zeroed chunk table 132 of the storage drive objects 44 indicate that the chunks have not been initialized to zero or if there is a write miss, at least one chunk has not been initialized to zero yet. In this situation, the storage processing circuitry zeroes the chunks on demand, writes the data, and updates the paged metadata area and the appropriate entry or entries in the zeroed chunk table 132.

It should be understood that whenever the storage processing circuitry changes the paged metadata area on disk (e.g., a write miss), or reads new paged metadata from the disk (e.g., a read miss), the storage processing circuitry updates the set of zeroed chunk tables 132 in the storage drive objects in the main memory. Such an update:
 1. Keeps all the cached data in slots up-to-date;
 2. For the new data to cache, selects one least-recently-used slot which does not have IO hit for the last 100 I/Os. This slot will be updated with the new paged metadata from disk.

In these arrangements, four slots could cache data for up to 512 Mbytes. According to principle of locality, the adjacent storage locations tend to be accessed frequently. This means the chance of a ZOD read/write cache hit is large.
 1. For every read/write hit, the storage processing circuitry skips one paged metadata area read, which saved us a half of disk operations already;
 2. If the paged metadata area read operations are reduced greatly, the I/Os have more changed to be destined to same area, which will greatly reduce average seek time (for HDD drives), thus improving IO performance.
 3. For every read/write loss, the IO service time is roughly the same as before.

Such modifications and enhancements are intended to belong to various embodiments of the disclosure.

What is claimed is:

1. In data storage equipment which includes a set of physical storage drives and storage processing circuitry which is constructed and arranged to access the set of physical storage drives, a method of processing input/output (I/O) requests from a set of host computers, the method comprising:
    storing, by the storage processing circuitry of the data storage equipment, a set of storage drive objects in main memory of the storage processing circuitry, each storage drive object among the set of storage drive objects including (i) a storage drive data area; and (ii) a zeroed chunk table, the storage drive object representing a respective physical storage drive among the set of physical storage drives, the storage drive data area including an identifier that uniquely identifies the respective physical storage drive, the respective physical storage drive including (i) a data region and (ii) a metadata region, the data region being divided into a plurality of storage chunks, the metadata region including a plurality of metadata areas associated with the plurality of storage chunks, respectively, the plurality of metadata areas containing a plurality of status indications of the plurality of storage chunks, respectively, the zeroed chunk table including a plurality of zeroed chunk table entries corresponding to the plurality of metadata areas, respectively;
    marking one or more of the plurality of status indications contained in the plurality of metadata areas to indicate that one or more of the respective storage chunks must be initialized to zero before use;
    having marked the one or more status indications contained in the plurality of metadata areas, marking one or more of the plurality of zeroed chunk table entries corresponding to the respective metadata areas containing the one or more marked status indications;
    receiving, by the storage processing circuitry, I/O requests from the set of host computers; and
    performing, by the storage processing circuitry, I/O tasks in response to the received I/O requests, the I/O tasks including zero on demand (ZOD) operations pertaining to the respective storage chunks, the performing of the ZOD operations including:
        making determinations as to whether any of the respective storage chunks must be initialized to zero before use by identifying the marked zeroed chunk table entries corresponding to the respective metadata areas containing the one or more marked status indications;
        having identified the marked zeroed chunk table entries, performing the ZOD operations on the one or more respective storage chunks indicated by the marked status indications as requiring initialization to zero before use; and
        having performed the ZOD operations on the one or more respective storage chunks, (i) unmarking the marked zeroed chunk table entries included in the zeroed chunk table, and (ii) unmarking the marked status indications contained in the plurality of metadata areas included in the metadata region of the respective physical storage drive.

2. A method as in claim 1 wherein the marking of the one or more status indications contained in the plurality of metadata areas is performed in response to receiving a bind command for a logical unit of storage (LUN), and wherein the method further comprises:
    having marked the one or more zeroed chunk table entries corresponding to the respective metadata areas containing the one or more marked status indications, directing a background service to initialize to zero the non-zeroed storage chunks of the LUN based on the zeroed chunk table.

3. A method as in claim 2 wherein performing the I/O tasks in response to the I/O requests includes:
    receiving an I/O request to access the LUN from a host computer, the I/O request identifying a storage chunk on a particular physical storage drive of the set of physical storage drives,
    accessing a particular storage drive object representing the particular physical storage drive to determine, from the zeroed chunk table of the particular storage drive object, whether the storage chunk on the particular physical storage drive has been initialized to zero, and
    only after the storage chunk on the particular physical storage drive has been initialized to zero, accessing the storage chunk on the particular physical storage drive in accordance with the I/O request.

4. A method as in claim 3 wherein the I/O request is a write command;
    wherein accessing the particular storage drive object representing the particular physical storage drive results in a determination that the storage chunk on the particular physical storage drive has not been initialized to zero; and
    wherein accessing the storage chunk on the particular physical storage drive in accordance with the I/O request includes (i) initializing the storage chunk to zero as a ZOD operation, (ii) writing data to the storage chunk, and (iii) marking the zeroed chunk table of the particular storage drive object to indicate that the storage chunk on the particular physical storage drive has been initialized to zero.

5. A method as in claim 3 wherein the I/O request is a write command;
wherein accessing the particular storage drive object representing the particular physical storage drive results in a determination that the storage chunk on the particular physical storage drive has already been initialized to zero; and
wherein accessing the storage chunk on the particular physical storage drive in accordance with the I/O request includes writing data to the storage chunk on the particular physical storage drive upon determining that the storage chunk on the particular physical storage drive has already been initialized to zero.

6. A method as in claim 3 wherein the I/O request is a read command;
wherein accessing the particular storage drive object representing the particular physical storage drive results in a determination that the storage chunk on the particular physical storage drive has not been initialized to zero; and
wherein accessing the storage chunk on the particular physical storage drive in accordance with the I/O request includes (i) returning zeros as a response to reading from the storage chunk, and (ii) maintaining the zeroed chunk table of the particular storage drive object to indicate that the storage chunk on the particular physical storage drive has not been initialized to zero.

7. A method as in claim 3 wherein the I/O request is a read command;
wherein accessing the particular storage drive object representing the particular physical storage drive results in a determination that the storage chunk on the particular physical storage drive has already been initialized to zero; and
wherein accessing the storage chunk on the particular physical storage drive in accordance with the I/O request includes reading data from the storage chunk on the particular physical storage drive upon determining that the storage chunk on the particular physical storage drive has already been initialized to zero.

8. A method as in claim 2 wherein performing the I/O tasks in response to the I/O requests includes:
performing read and write operations in response to the I/O requests while the background service initializes to zero the non-zeroed storage chunks of the LUN based on the zeroed chunk table, the read and write operations being performed within the data storage equipment as higher priority operations relative to the background service.

9. A method as in claim 1, further comprising:
maintaining synchronization between the plurality of metadata areas associated with the plurality of storage chunks, respectively, and the plurality of zeroed chunk table entries corresponding to the plurality of metadata areas, respectively.

10. Data storage equipment, comprising:
a set of host interfaces constructed and arranged to communicate with a set of host computers;
a set of physical storage drives; and
control circuitry coupled to the set of host interfaces and set of physical storage drives, the control circuitry being constructed and arranged to:
store a set of storage drive objects in main memory of the storage processing circuitry, each storage drive object among the set of storage drive objects including (i) a storage drive data area and (ii) a zeroed chunk table, the storage drive object representing a respective physical storage drive among the set of physical storage drives, the storage drive data area including an identifier that uniquely identifies the respective physical storage drive, the respective physical storage drive including (i) a data region and (ii) a metadata region, the data region being divided into a plurality of storage chunks, the metadata region including a plurality of metadata areas associated with the plurality of storage chunks, respectively, the plurality of metadata areas containing a plurality of status indications of the plurality of storage chunks, respectively, the zeroed chunk table including a plurality of zeroed chunk table entries corresponding to the plurality of metadata areas, respectively;
mark one or more of the plurality of status indications contained in the plurality of metadata areas to indicate that one or more of the respective storage chunks must be initialized to zero before use;
having marked the one or more status indications contained in the plurality of metadata areas, mark one or more of the plurality of zeroed chunk table entries corresponding to the respective metadata areas containing the one or more marked status indications;
receive input/output (I/O) requests from the set of host computers through the set of host interfaces, and
perform I/O tasks in response to the I/O requests, the I/O tasks including zero on demand (ZOD) operations pertaining to the respective storage chunks, the ZOD operations including:
making determinations as to whether any of the respective storage chunks must be initialized to zero before use by identifying the marked zeroed chunk table entries corresponding to the respective metadata areas containing the one or more marked status indications;
having identified the marked zeroed chunk table entries, performing the ZOD operations on the one or more respective storage chunks indicated by the marked status indications as requiring initialization to zero before use; and
having performed the ZOD operations on the one or more respective storage chunks, (i) unmarking the marked zeroed chunk table entries included in the zeroed chunk table, and (ii) unmarking the marked status indications contained in the plurality of metadata areas included in the metadata region of the respective physical storage drive.

11. Data storage equipment as in claim 10 wherein the control circuitry is further constructed and arranged to:
receive a bind command for a logical unit of storage (LUN),
in response to the bind command and prior to receiving the I/O requests from the set of host computers, mark the one or more status indications contained in the plurality of metadata areas to indicate that one or more non-zeroed storage chunks of the LUN must be initialized to zero, and having marked the one or more zeroed chunk table entries corresponding to the respective metadata areas containing the one or more marked status indications, direct a background service to initialize to zero the non-zeroed storage chunks of the LUN based on the zeroed chunk table.

12. Data storage equipment as in claim 11 wherein the control circuitry, when performing the I/O tasks in response to the I/O requests, is constructed and arranged to:
receive an I/O request to access the LUN from a host computer, the I/O request identifying a storage chunk on a particular physical storage drive of the set of physical storage drives,
access a particular storage drive object representing the particular physical storage drive to determine, from the zeroed chunk table of the particular storage drive object, whether the storage chunk on the particular physical storage drive has been initialized to zero, and
only after the storage chunk on the particular physical storage drive has been initialized to zero, access the storage chunk on the particular physical storage drive in accordance with the I/O request.

13. Data storage equipment as in claim 10 wherein the control circuitry is further constructed and arranged to:
maintain synchronization between the plurality of metadata areas associated with the plurality of storage chunks, respectively, and the plurality of zeroed chunk table entries corresponding to the plurality of metadata areas, respectively.

14. A computer program product having a non-transitory computer readable medium which stores a set of instructions to process input/output (I/O) requests, the set of instructions, when carried out by computerized circuitry, causing the computerized circuitry to perform a method of:
storing a set of storage drive objects in main memory of the storage processing circuitry, each storage drive object among the set of storage drive objects including (i) a storage drive data area; and (ii) a zeroed chunk table, the storage drive object representing a respective physical storage drive among the set of physical storage drives, the storage drive data area including an identifier that uniquely identifies the respective physical storage drive, the respective physical storage drive including (i) a data region and (ii) metadata region, the data region being divided into a plurality of storage chunks, the metadata region including a plurality of metadata areas associated with the plurality of storage chunks, respectively, the plurality of metadata areas containing a plurality of status indications of the plurality of storage chunks, respectively, the zeroed chunk table including a plurality of zeroed chunk table entries corresponding to the plurality of metadata areas, respectively;
marking one or more of the plurality of status indications contained in the plurality of metadata areas to indicate that one or more of the respective storage chunks must be initialized to zero before use;
having marked the one or more status indications contained in the plurality of metadata areas, marking one or more of the plurality of zeroed chunk table entries corresponding to the respective metadata areas containing the one or more marked status indications;
receiving I/O requests from the set of host computers; and
performing I/O tasks in response to the received I/O requests, the I/O tasks including zero on demand (ZOD) operations pertaining to the respective storage chunks, the performing of the ZOD operations including:
making determinations as to whether any of the respective storage chunks must be initialized to zero before use by identifying the marked zeroed chunk table entries corresponding to the respective metadata areas containing the one or more marked status indications;
having identified the marked zeroed chunk table entries, performing the ZOD operations on the one or more respective storage chunks indicated by the marked status indications as requiring initialization to zero before use; and
having performed the ZOD operations on the one or more respective storage chunks, (i) unmarking the marked zeroed chunk table entries included in the zeroed chunk table, and (ii) unmarking the marked status indications contained in the plurality of metadata areas included in the metadata region of the respective physical storage drive.

15. A computer program product as in claim 14 wherein the marking of the one or more status indications contained in the plurality of metadata areas is performed in response to receiving a bind command for a logical unit of storage (LUN), and wherein the method further comprises:
having marked the one or more zeroed chunk table entries corresponding to the respective metadata areas containing the one or more marked status indications, directing a background service to initialize to zero the non-zeroed storage chunks of the LUN based on the zeroed chunk table.

16. A computer program product 15 wherein performing the I/O tasks in response to the I/O requests includes:
performing read and write operations in response to the I/O requests while the background service initializes to zero the non-zeroed storage chunks of the LUN based on the zeroed chunk table, the read and write operations being performed within the data storage equipment as higher priority operations relative to the background service.

17. A computer program product 16 wherein performing the read and write operations in response to the I/O requests includes:
receiving an I/O request to access the LUN from a host computer, the I/O request identifying a storage chunk on a particular physical storage drive of the set of physical storage drives,
accessing a particular storage drive object representing the particular physical storage drive to determine, from the zeroed chunk table of the particular storage drive object, whether the storage chunk on the particular physical storage drive has been initialized to zero, and
only after the storage chunk on the particular physical storage drive has been initialized to zero, accessing the storage chunk on the particular physical storage drive in accordance with the I/O request.

* * * * *